(12) United States Patent
Eckert

(10) Patent No.: US 8,535,192 B2
(45) Date of Patent: Sep. 17, 2013

(54) TRANSMISSION ARRANGEMENT FOR A MOTOR VEHICLE

(75) Inventor: Franz-Josef Eckert, Ober-Olm (DE)

(73) Assignee: GM Global Technology Operations LLC, Detroit, MI (US)

( * ) Notice: Subject to any disclaimer, the term of this patent is extended or adjusted under 35 U.S.C. 154(b) by 201 days.

(21) Appl. No.: 13/012,925

(22) Filed: Jan. 25, 2011

(65) Prior Publication Data

US 2011/0183803 A1 Jul. 28, 2011

(30) Foreign Application Priority Data

Jan. 27, 2010 (DE) .......................... 10 2010 005 830

(51) Int. Cl.
 *F16H 48/06* (2006.01)
(52) U.S. Cl.
 USPC .......................................................... 475/220
(58) Field of Classification Search
 USPC .......................................... 475/230, 246, 347
 See application file for complete search history.

(56) References Cited

U.S. PATENT DOCUMENTS

| | | | |
|---|---|---|---|
| 3,531,144 A | 9/1970 | Ring | |
| 3,770,994 A | 11/1973 | Smith | |
| 3,901,102 A * | 8/1975 | Manwaring | 475/246 |
| 4,524,503 A | 6/1985 | Nakamata | |
| 4,722,244 A | 2/1988 | Tsuchiya | |
| 5,131,894 A * | 7/1992 | Hilker | 475/230 |
| 5,584,777 A | 12/1996 | Sander et al. | |
| 5,980,417 A * | 11/1999 | Wopshall, Jr. | 475/230 |
| 6,315,671 B1 | 11/2001 | Bilz | |
| 6,368,242 B1 * | 4/2002 | Irwin | 475/230 |
| 6,390,925 B1 | 5/2002 | Perrow | |
| 7,198,425 B2 * | 4/2007 | Bergkvist et al. | 403/359.5 |
| 7,479,087 B2 * | 1/2009 | Veldman et al. | 475/230 |
| 2006/0188328 A1 | 8/2006 | Gutierrez et al. | |

FOREIGN PATENT DOCUMENTS

| | | |
|---|---|---|
| DE | 2009130 A1 | 9/1970 |
| DE | 3132365 A1 | 3/1983 |
| DE | 19704729 A1 | 8/1998 |
| EP | 0902196 A1 | 3/1999 |
| FR | 2486608 A1 | 1/1982 |
| GB | 2104190 A | 3/1983 |
| GB | 2179714 A | 3/1987 |
| GB | 2338037 A | 12/1999 |
| JP | 2009257531 A | 11/2009 |

OTHER PUBLICATIONS

British Patent Office, British Search Report for British Application No. 1101229.1, Apr. 7, 2011.
German Patent Office, German Search Report for Application No. 10 2010 005 824.6 dated Oct. 19, 2010.

* cited by examiner

*Primary Examiner* — David D Le
*Assistant Examiner* — David J Hlavka
(74) *Attorney, Agent, or Firm* — Ingrassia Fisher Lorenz, P.C.

(57) ABSTRACT

A transmission arrangement is provided for a motor vehicle that includes, but is not limited to a first gear wheel, a first shaft, and a first shaft-like connecting element. The first shaft-like connecting element includes, but is not limited to a first end portion and a second end portion. The first shaft-like connecting element is connected with its first end portion to the first gear wheel and with its second end portion to the first shaft. The first shaft-like connecting element is connected with its first end portion to the first gear wheel via a first plug connection. The first plug connection is secured by means of a first retaining element provided on the circumferential surface of the first shaft-like connecting element.

8 Claims, 2 Drawing Sheets

TRANSMISSION ARRANGEMENT FOR A MOTOR VEHICLE

CROSS-REFERENCE TO RELATED APPLICATION

This application claims priority to German Patent Application No. DE 10 2010 005 830.0, filed Jan. 27, 2010, which is incorporated herein by reference in its entirety.

TECHNICAL FIELD

The technical field relates to a transmission arrangement for a motor vehicle.

BACKGROUND

The transmission arrangements for motor vehicles usually comprise a casing, in which a plurality of gear wheels are disposed as well as openings for the passage of shafts, which are connected to the gear wheels. A transfer of momentum from one shaft to another can take place via the gear wheels, for example, accompanied by a change of the shaft rotational speed. The shafts are sealed with respect to the casing by means of dynamic seals, to avoid the escape of gear oil. In order to allow the preassembly of a transmission arrangement already filled with oil, for example, shaft-like connecting elements are used, which are connected to corresponding shafts of a drive train during the mounting of the transmission arrangement in the motor vehicle. A disadvantage with the known transmission arrangements for motor vehicles is that the installation of shaft-like connecting elements requires expensive assembly.

It is therefore at least one object of the present invention to provide a transmission arrangement for a motor vehicle, which allows a more simplified assembly. In addition, other objects, desirable features and characteristics will become apparent from the subsequent summary and detailed description, and the appended claims, taken in conjunction with the accompanying drawings and this background.

SUMMARY

The transmission arrangement for a motor vehicle comprises a first gear wheel, a first shaft, and a first shaft-like connecting element. The first shaft-like connecting element comprises a first end portion and a second end portion. The first shaft-like connecting element is connected with its first end portion to the first gear wheel and with its second end portion to the first shaft. The first shaft-like connecting element is connected with its first end portion to the first gear wheel via a first plug connection. The first plug connection is secured by means of a first retaining element provided on the circumferential surface of the first shaft-like connecting element.

In the transmission arrangement, for example, a differential transmission of a motor vehicle, the first shaft-like connecting element can connect a first gear wheel, for example, a bevel gear, to an associated shaft, for example, a shaft of a drive train. The first shaft-like connecting element in this case can have a shaft-like shape which is rotationally symmetric about a central axis. The first shaft-like connecting element has two end portions, a first end portion, which is disposed on the end of the first shaft-like connecting element facing the first gear wheel and a second end portion, which is disposed on the end of the first shaft-like connecting element opposite the first end portion. The first shaft-like connecting element is detachably connected to the first gear wheel by means of a first plug connection. The first plug connection can be configured in such a manner that the first shaft-like connecting element has an outer profile on its first end portion, for example, a spline, which can engage in a correspondingly configured inner profile of the first gear wheel. The first plug connection is preferably secured against an axial movement directed along the central axis of the first shaft-like connecting element in the direction of the first shaft, in order, for example, to avoid an unintentional release of the first shaft-like connecting element. The securing is accomplished by means of a first retaining element, which is disposed on the first end portion on the circumferential surface of the first shaft-like connecting element.

Since the first shaft-like connecting element is connected to the first gear wheel by means of a first plug connection and is secured against sliding out axially by means of a first retaining element, no additional tools are required during the final assembly, the installation of the transmission arrangement according to the invention in a motor vehicle. As a result, assembly, in particular the connection of the transmission arrangement to the drive train of the motor vehicle is simplified and can thereby be accomplished in a shorter time, whereby cost savings are possible. In addition, by using the transmission arrangement according to the invention, any damage to the dynamic seals can be avoided since these are in contact with the already preassembled, first shaft-like connecting element and not with a first shaft adjoining the first shaft-like connecting element.

It is preferably provided that the first retaining element is configured to be elastically deformable. As a result, mounting of the first retaining element on the first shaft-like connecting element is possible without requiring additional tools, since the first retaining element can be elastically deformed and thus, for example, can be clipped over the circumferential surface of the first shaft-like connecting element.

In an embodiment, the first retaining element is configured in the form of a circlip. Through using a circlip as a first retaining element, the production costs can be reduced since a circlip comprises a standard mechanical engineering component.

It is preferably provided that at the first end portion the first shaft-like connecting element has a first recess for receiving the first retaining element. In this case, the first recess for receiving the first retaining element can be configured in the form of a groove, which can be formed around the central axis along the circumferential surface of the first shaft-like connecting element. The first recess can be dimensioned in such a manner that the first retaining element can be received and that in the case of an elastic deformation, for example, by compressing, the first retaining element can be disposed in the first recess at least superficially flush with the circumferential surface. As a result of this arrangement of the first retaining element in the first recess, the first retaining element can be compressed in the radial direction during the mounting of the first plug connection, for example, through the inner profile of the first gear wheel and thereby pushed with the first end portion of the first shaft-like connecting element through the first gear wheel and then expand radially again at a position outside the inner teeth of the first gear wheel. As a result, an unintentional release of the shaft-like connecting element in the axial direction can be avoided.

According to an embodiment, the first gear wheel has an inner profile radially on the inside and the inner profile has a first outer bevel on a side surface facing the first shaft disposed on the second end portion of the first shaft-like connecting element and the inner profile has a first inner bevel axially on a side surface facing away from the first shaft. The inner profile of the first gear wheel can be configured radially on the inside, on a surface facing the first shaft-like connecting element. The inner profile is preferably adapted to an outer profile of the first shaft-like connecting element engaging in the inner profile. The inner profile of the first gear wheel can, for example, be configured in the form of a spline or inner teeth. The first gear wheel has an outer side surface facing the second end portion of the first shaft-like connecting element which faces the first shaft disposed on the second end portion. The first gear wheel further has an inner side surface on the side facing away from the first shaft. The inner side surface of the first gear wheel can have a rotationally symmetric shoulder about the central axis. The inner profile comprises an outer bevel in the axial direction on the outer side surface and an inner bevel on the inner side surface. Due to the outer bevel and/or the inner bevel, the edge of the substantially rectangular transition from one side surface to the radially inward-lying surface of the inner profile is broken and a beveled transition takes place. When inserting the first shaft-like connecting element with the first retaining element in the first plug connection, the outer bevel continuously elastically compresses the first retaining element on contact with the outer bevel until the first retaining element has an external diameter which allows it to be pushed through the inner profile of the first gear wheel together with the first end portion of the first shaft-like connecting element. In a ready-mounted position of the first shaft-like connecting element, the first retaining element can expand radially outward at least at the inner bevel of the first gear wheel. As a result, the first retaining element can abut against the inner side surface of the first gear wheel, for example, directly against the bevel and can consequently secure the first shaft-like connecting element against pulling out from the first gear wheel in the axial direction. As a result of the configuration of the inner bevel, a renewed elastic compression of the first retaining element can be rendered possible under a force acting axially in the direction of the first shaft, whereby the first plug connection can be configured to be detachable.

It is preferably provided that the first outer bevel has a mounting angle and the first inner bevel has a retaining angle, wherein the ratio of the mounting angle to the retaining angle is approximately $\leq 1°$. The mounting angle of the first outer bevel and the retaining angle of the inner bevel are relative to a geometric axis or are measured from a geometric axis of the first gear wheel, which can be disposed coaxially to the central axis of the first shaft-like connecting element, wherein a mounting angle and/or retaining angle having a value of approximately 0° is provided coaxially to the geometric axis and a value of approximately 90° is provided perpendicular to the geometric axis. By changing the ratio of the mounting angle to the retaining angle, it can, for example, be adjusted that the force required for mounting the first plug connection under elastic deformation of the first retaining element on the outer bevel should be lower than the force required to release the first plug connection and the elastic deformation of the first retaining element on the inner bevel. The ratio of the mounting angle to the retaining angle in an embodiment is approximately $\leq 0.75°$ and in another embodiment approximately $\leq 0.5°$. In another embodiment the value of the mounting angle can be approximately 25°. By providing a higher force for the release of the first plug connection, an unintentional release of the shaft-like connecting element from the gear wheel can be avoided.

Furthermore, according to an embodiment of the invention, the first shaft-like connecting element is connected with its second end portion to the first shaft via a second plug connection. In this case, the second plug connection can be configured in such a manner that the first shaft-like connecting element has an outer profile or an inner profile on its second end portion, which engages in a correspondingly shaped inner profile or in a corresponding outer profile of the first shaft. On its second end portion, the first shaft-like connecting element can have a recess having an inner profile, in which a correspondingly shaped outer profile of the first shaft can engage. By using a second plug connection for connecting the first shaft-like connecting element to the first shaft, the advantages of the simple, rapid, and inexpensive mounting for a detachable connection, as is the case when using the first plug connection to connect the first shaft-like connecting element to the first gear wheel, can also be utilized.

It is further provided according to an embodiment that the second plug connection is secured by means of a second retaining element provided on the circumferential surface of the first shaft-like connecting element. The use of a second retaining element for securing the second plug connection against release enables simplified assembly without the need for special tools. Furthermore, by matching the retaining angle on the first plug connection and a retaining angle on the second plug connection, for example, by means of a smaller retaining angle on the first plug connection than on the second plug connection, it can be ensured that, for example, when dismantling the transmission arrangement for repair purposes, under the action of an axial force in the direction of the first shaft, firstly the second plug connection between the first shaft-like connecting element and the first shaft can be released. A higher force is then required to release the first plug connection between the first retaining element and the first gear wheel. In order to prevent the penetration of dirt into the second plug connection, sealing rings, for example, O-rings can be disposed in the second plug connection.

According to an embodiment, the transmission arrangement is configured in such a manner that a second gear wheel, a second shaft, and a second shaft-like connecting element is provided, wherein the second shaft-like connecting element comprises a third end portion and a fourth end portion, wherein the second shaft-like connecting element is connected with its third end portion to the second gear wheel via a third plug connection and is connected with its fourth end portion to the second shaft via a fourth plug connection, wherein the third plug connection and/or the fourth plug connection is secured by means of a third and/or fourth retaining element provided in each case on the circumferential surface of the second shaft-like connecting element. By using at least a second shaft-like connecting element, it is possible to connect at least one second shaft by means of a simplified mounting to the transmission arrangement according to the invention. By this means, it is possible, for example, to install a transmission without additional tools in a motor vehicle or to exchange it for example during repair work. Furthermore, the transmission arrangement can be supplied mounted and already filled with oil for final assembly. In addition, shafts adjoining the transmission arrangement do not come in contact with dynamic seals which could be damaged if the shafts are directly connected to the gear wheels, whereby damaged dynamic seals and a possible loss of oil can be avoided.

A motor vehicle is also provided that comprises at least one transmission arrangement configured and further developed as hereinbefore.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
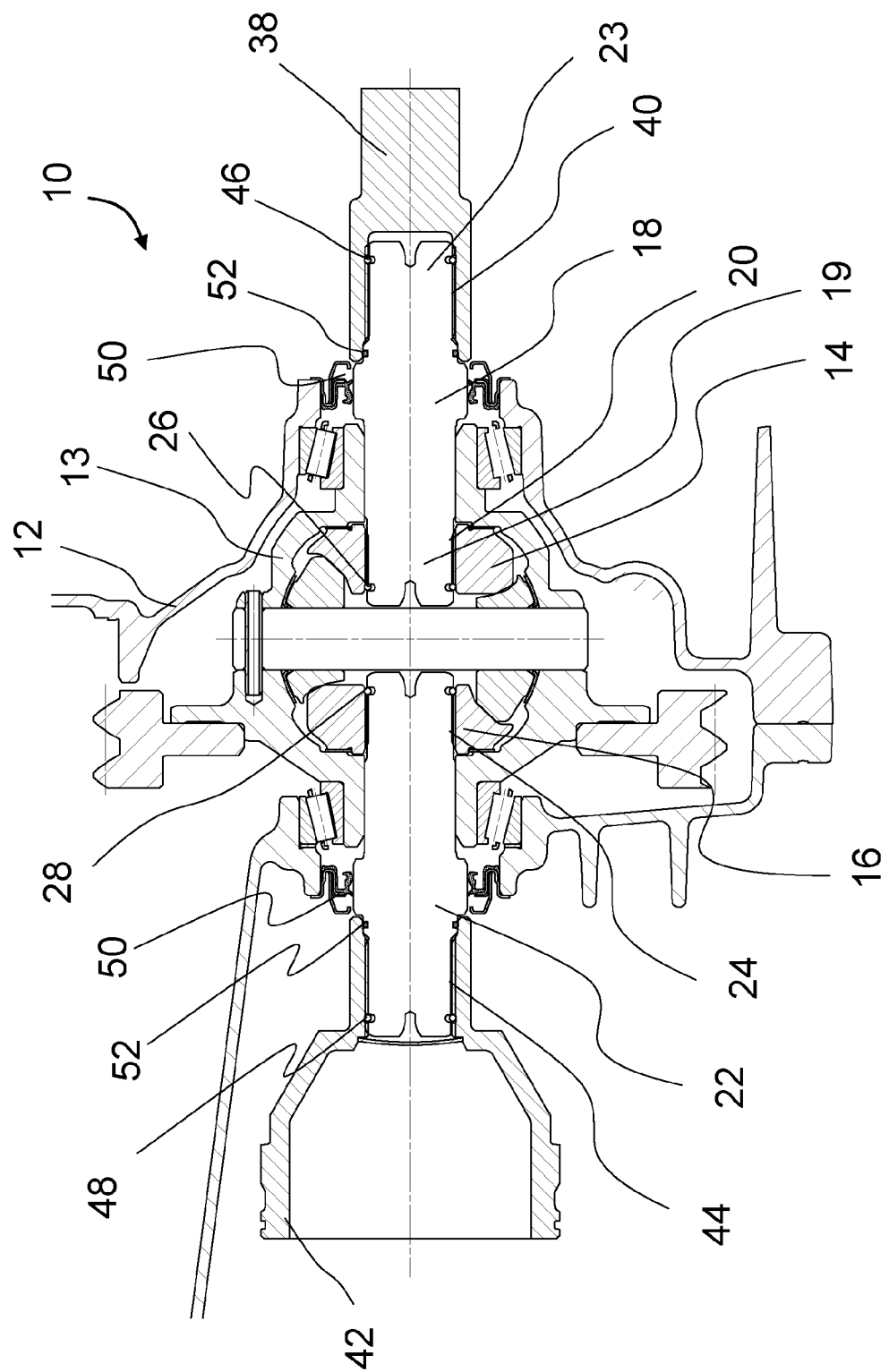
FIG. 1 shows a cutaway schematic view of a transmission arrangement that is connected to a first and a second shaft.
Figure 2:
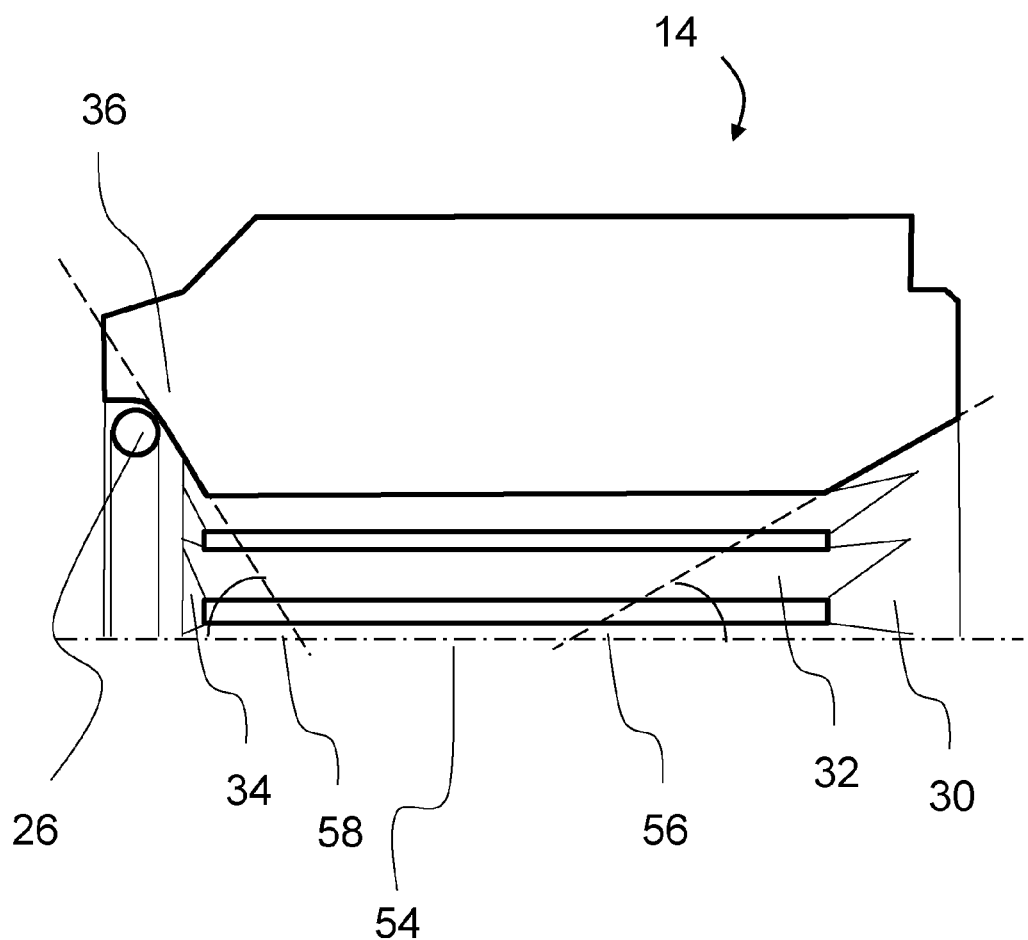
FIG. 2 shows a cutaway schematic view of an inner profile of a gear wheel having an outer bevel and an inner bevel.

FIG. 1 shows a transmission arrangement 10 according to the invention for a motor vehicle in the form of a differential transmission. The transmission arrangement 10 is disposed inside a casing 12 and comprises a differential casing 13, in which a first gear wheel 14 and a second gear wheel 16 are disposed. The first gear wheel 14 is detachably connected to a first shaft-like connecting element 18, which has a first end portion 19, via a first plug connection 20. The second gear wheel 16 is detachably connected to a second shaft-like connecting element 22 via a third plug connection 24. The first plug connection 20 and the third plug connection 24 are preferably configured to be substantially identically constructed. The first plug connection 20 is secured against any axial release by a first retaining element 26. The first retaining element 26 is disposed in a groove of the first shaft-like connecting element 18 and is preassembled before mounting the first plug connection 20 on the first shaft-like connecting element 18. The groove in the first shaft-like connecting element 18 is preferably configured to be of such a depth that the first retaining element 26 can be elastically radially compressed during mounting of the first plug connection 20 on the first outer bevel 30 of the first gear wheel 14 in such a manner that the first retaining element 26 can be pushed through an inner profile 32 of the first gear wheel 14, as can be seen in FIG. 2. On a first inner bevel 34 of the first gear wheel 14, the first retaining element 26 can expand radially outward and thereby engage behind the inner profile 32 of the first gear wheel 14. For receiving the first retaining element 26, a shoulder 36 is provided in the radial direction on the side surface of the first gear wheel 14 on which the inner bevel 34 of the first gear wheel 14 is disposed. The shoulder 36 enables expansion of the first retaining element 26 without the first retaining element 26 projecting in the axial direction beyond the dimensions of the first gear wheel 14.

Furthermore, the first shaft-like connecting element 18 is connected at a second end portion 23 to a first shaft 38 by means of a second plug connection 40 and the second shaft-like connecting element 22 is connected to a second shaft 42 by means of a fourth plug connection 44. The first shaft 38 is then connected to the first gear wheel 14 for the transfer of momentum and the second shaft 42 is connected to the second gear wheel 16 for the transfer of momentum. The second plug connection 40 is thereby secured by a second retaining element 46 and the fourth plug connection 44 is secured by a fourth retaining element 48. The first shaft-like connecting element 18 and the second shaft-like connecting element 22 are mounted and guided in the differential casing 13 and are sealed by means of dynamic seals 50 toward the casing 12 to avoid any escape of oil from the casing 12 and penetration of dirt into the casing 12. In order to improve the lubrication, oil grooves, not shown here, can be provided in the differential casing 13 or, for example, the first shaft-like connecting element 18. The second plug connection 40 and the fourth plug connection 44 are protected from the penetration of dirt by sealing rings 52, for example, O-rings.

FIG. 2 shows a cutaway schematic view of the inner profile 32 of the first gear wheel 14 configured rotationally symmetrically about a geometric axis 54. The inner profile 32 is configured in the form of spline teeth. On an outer side facing the first shaft 38, the inner profile 32 has the outer bevel 32. The outer bevel 32 is configured at a mounting angle 56 to the geometric axis 54 of the first gear wheel 14. On a side facing away from the first shaft 38, the first gear wheel 14 has the inner bevel 34. The inner bevel 34 is configured in this case at a retaining angle 58 to the geometric axis of the first gear wheel 14. In the side surface facing away from the first shaft 38, the first gear wheel 14 has the shoulder 36. which receives the first retaining element 26 expanded and/or relaxed in the radial direction. As a result, the first retaining element 26 does not protrude in the axial direction beyond the first gear wheel 14 and as a result of its radial expansion over the smallest diameter of the inner profile 32, can secure the first shaft-like connecting element 18 against axial release.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A transmission arrangement for a motor vehicle, comprising:
    a first gear wheel;
    a first shaft; and
    a first shaft connecting element comprising:
        a first end portion connecting the first shaft connecting element and the first gear wheel; and
        a second end portion connecting the first shaft connecting element and the first shaft;
    a first plug connection connecting the first end portion to the first gear wheel;
    a second plug connection adapted to connect the second end portion to the first shaft; and
    a first retaining element on a circumferential surface of the first shaft connecting element and adapted to secure the first plug connection.

2. The transmission arrangement according to claim 1, wherein the first retaining element is elastically deformable.

3. The transmission arrangement according to claim 2, wherein the first retaining element comprises a circlip.

4. The transmission arrangement according to claim 1, further comprising a first recess at the first end portion adapted to receive the first retaining element.

5. The transmission arrangement according to claim 1,
    wherein the first gear wheel comprises an inner profile radially on an inside,
    wherein the inner profile comprises a first outer bevel on a side surface facing the first shaft disposed on the second end portion, and
    wherein the inner profile comprises a first inner bevel axially on a second side surface facing away from the first shaft.

6. The transmission arrangement according to claim 5,
    wherein the first outer bevel comprises a mounting angle and the first inner bevel comprises a retaining angle, and\ wherein a ratio of the mounting angle to the retaining angle is approximately $\leqq 1$.

7. The transmission arrangement according to claim 1, further comprising a second retaining element on the circumferential surface of the first shaft connecting element that is adapted to secure the second plug connection.

8. A transmission arrangement for a motor vehicle, comprising:
- a first gear wheel;
- a first shaft; and
- a first shaft connecting element comprising:
   - a first end portion connecting the first shaft connecting element and the first gear wheel; and
   - a second end portion connecting the first shaft connecting element and the first shaft;
- a first plug connection connecting the first end portion to the first gear wheel;
- a first retaining element on a circumferential surface of the first shaft connecting element and adapted to secure the first plug connection;
- a second gear wheel;
- a second shaft; and
- a second shaft connecting element comprises:
   - a third end portion; and
   - a fourth end portion;
- a third plug connection connecting the third end portion to the second gear wheel;
- a fourth plug connection connecting the fourth end portion to the second shaft;
- a third retaining element on a second circumferential surface of the second shaft connecting element adapted to secure the third plug connection; and
- a fourth retaining element on the circumferential surface of the second shaft connecting element adapted to secure the fourth plug connection.

* * * * *